2,900,179

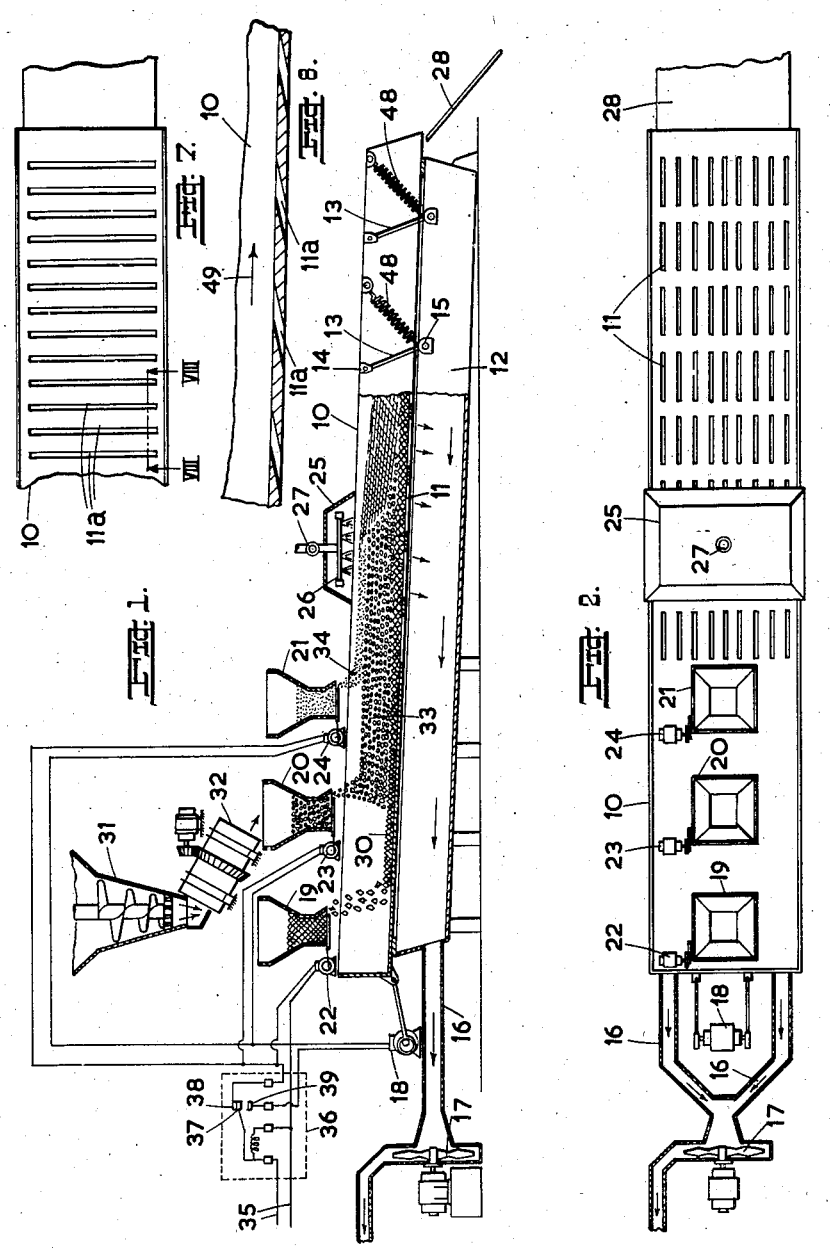

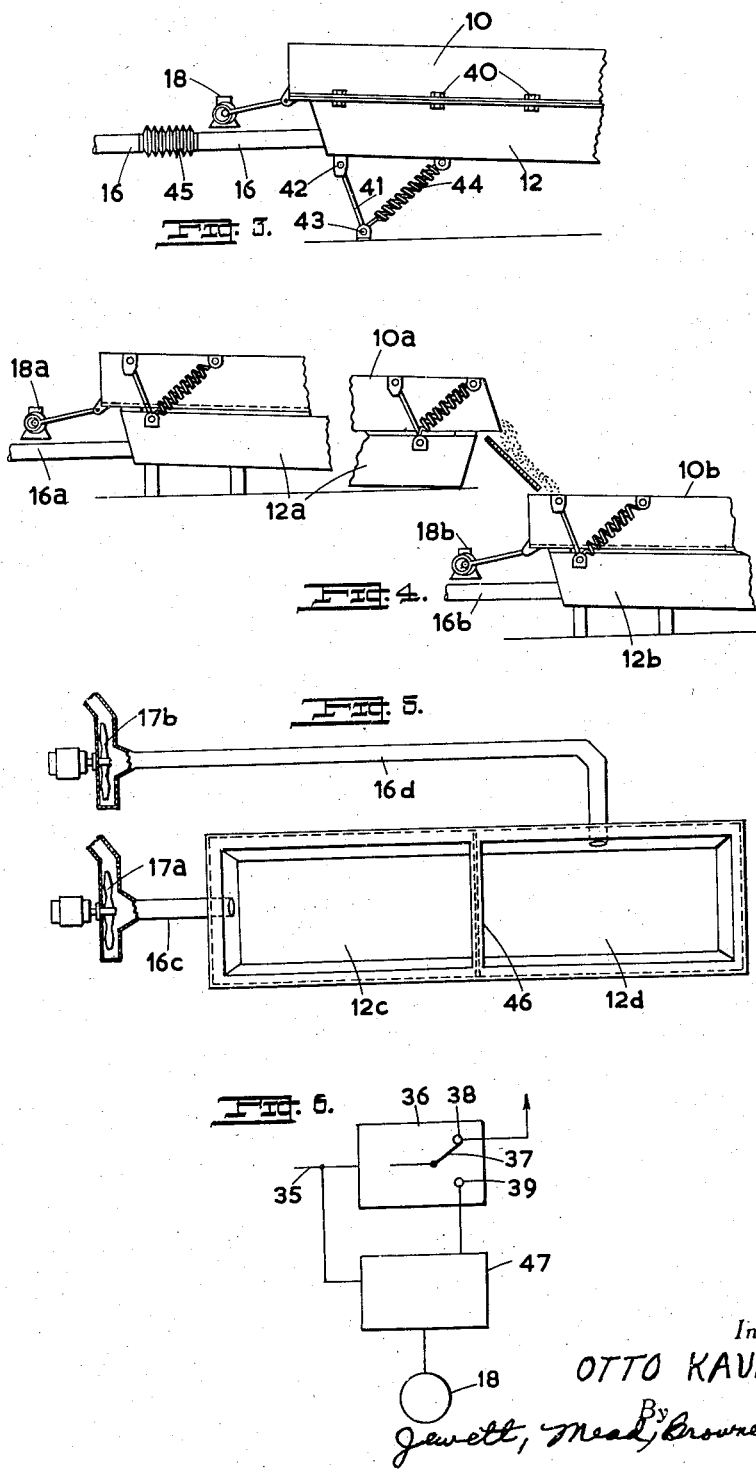

IMPROVEMENTS IN OR RELATING TO TREATING MATERIALS BY A HEAT TRANSFER PROCESS SUCH AS ROASTING, SINTERING, CALCINING, DRYING AND THE LIKE

Otto Kaufmann, Friern Barnet, London, England

Application October 7, 1953, Serial No. 384,671

Claims priority, application Great Britain October 10, 1952

5 Claims. (Cl. 263—52)

The present invention relates to the heat transfer processing of materials, such as the roasting of ores, calcining of lime, dolomite or magnesite, sintering of cement raw material, dolomite or magnesite, bloating of clay, shale and other lightweight materials, drying of lumpy, granular or granulated goods and the like heat transfer processes. The invention is more particularly concerned with apparatus for carrying out such processes and with the method of operating such apparatus.

In a well known machine for the heat transfer processing of material large numbers of closely linked containers or pallets which have perforated bottoms and are filled with the material to be treated, are moved through a heat transfer processing zone or furnace. These closely linked pallets form, as it were, an endless belt or travelling grate, and they are moved on rails through a furnace or kiln from a loading station to the discharge station whence they return empty to the loading station. The processing takes place in such a manner that liquid or gaseous fuel is burnt above the pallots and the combustion gases are caused to pass downwards through the material. Alternatively the material to be treated is mixed with solid fuel, pre-heated and subsequently ignited. Combustion air is then caused to pass downwards through the material to be treated in order to promote the combustion. A fume or suction box is arranged underneath the rails which support the pallets on their way through the furnace and is connected to a fan so that a partial vacuum can be produced within the box, to draw combustion air, combustion gases or cooling air, as the case may be, through the material to be treated.

In practice it is found that with such apparatus irregular channels are formed within the material in the pallets as a result of shrinkage of the material during the process. Air can pass through these channels thus by-passing the material to be treated and resulting in an uneven burning and sintering of the material. Moreover it will be appreciated that a large number of pallets are idle during their return from the discharge station of the furnace to the loading station so that more pallets are required above the number required to fill the path between the loading station and the discharge station, thereby considerably increasing the weight of the machine, the space required and the power consumption.

In order to overcome these difficulties, it has been proposed to replace the travelling grate of closely linked pallets by a shaker conveyor, consisting of a trough having a perforated bottom and being subjected to a continuous shaking movement in order to cause the material to travel along the trough. This construction does not involve idle returning pallets, and the shaking of the trough prevents the formation of channels within the material thus promoting uniformly treated material. However, in view of the complex shaking motion of the trough required for the movement of the material, it has proved to be practically impossible to provide a satisfactory seal between the trough and the box therebeneath so that a considerable amount of false air which adversely affects the heat economy has been drawn in; in addition it has been found that the progress of the material towards the discharge end of the trough is too fast and that it is impossible to reduce the speed of movement without impairing conveying action. Whilst best results are obtained with speeds of material being treated less than one-half inch per second, the usual speed of the material on a shaking conveyor is approximately twelve inches per second, and such speed cannot be made less than four inches per second without affecting the efficiency of the shaking trough. To overcome these disadvantages it would be necessary to provide an unduly long conveyor trough, and this would not only increase the size and the costs of the machine, but also the amount of false air drawn in to the fume box.

It is an object of the present invention to overcome these disadvantages and to provide an improved machine wherein material is subjected to a heat transfer process whilst it is on a perforated trough.

It is a further object of the invention to provide an improved method of operating a perforated trough heat transfer process machine. A further object of the invention is to provide an improved perforated trough heat transfer process apparatus.

According to one feature of the present invention a method of operating a heat transfer process machine of the type including an elongated perforated trough includes the steps of feeding materials to be heat treated and fuel to the trough adjacent one end thereof, shaking the trough intermittently at a speed to cause materials thereon to progress from said one end to the other end thereof, igniting the fuel thereon, causing air to pass through the material and fuel thereon, and discharging treated material intermittently from said other end.

According to a further feature of the present invention a heat transfer process such as sintering includes the steps of feeding material to be treated on to a conveying means and shaking the conveying means intermittently at a speed to cause the material to be progressed through a treatment zone.

According to a still further feature of the invention apparatus for subjecting materials to a heat transfer process such as sintering includes an elongated perforated trough, means for feeding materials to said trough, means for shaking said trough intermittently at a speed to cause materials to progress therealong, and means for applying a heat transfer process to said material whilst on said trough.

Thus the material is only advanced along the trough during very short periods. The material is preferably fed to the trough during the intervals between these periods and during such intervals the trough may remain at rest or may be shaken slowly at a speed that is not sufficient to cause materials to progress along the trough. The duration of the shaking periods and the intensity of the shaking during such periods can be readily adjusted in order to obtain any desired rate of sliding movement of the material along the trough. Moreover, the shaking effectively closes any channels which might have been formed in the material due to shrinkage thereby enabling a more uniform treatment to be imparted to the material.

If the trough is at rest during the intervals between the shaking periods it is preferably arranged to make a seal between itself and the box therebeneath so that the intake of false air into the box, that is to say, the entry into the box of air which has not traversed through the material in the perforated trough, is reduced.

The box beneath the trough may be formed as a single casing from which gases are withdrawn through one or more ducts leading to one or more fans. Alternatively the casing may be sub-divided in order to form at least two boxes so that gases from different zones of the trough can be separated from one another. For example, combustion gases from material in a first zone of the trough may be withdrawn separately, whilst for cooling purposes air may be caused to pass through another box and through the material in another zone of the trough. In certain cases it may be desirable to cause the air to pass downwards in one zone of the trough, for example, in the first zone, and upwards in another zone, and this may readily be obtained by sub-dividing the box into two boxes each of which is connected to a separate fan, one arranged as a suction fan and the other as a blowing fan. Alternatively this effect may be obtained by providing two separate troughs each disposed above a box individual thereto, the troughs being so disposed that the discharge end of one trough is adjacent the inlet or loading end of the other trough so that material after being conveyed along one trough is transferred to the second trough, the box beneath the first trough being connected to the suction side of one fan and the box beneath the second trough being connected to the outlet side of another fan. The two troughs may be shaken by the same mechanism though it is preferable to provide a separate shaking mechanism for each trough so that the length of shaking periods and the intensities of shaking during such periods may be adjusted individually for each trough.

Whilst it is possible for the trough to be shaken relatively to the box therebeneath, the present invention also envisages the trough and the box therebeneath being connected to one another and shaken together as a single unit. By this arrangement a permanent seal may be obtained between the trough and the box and the risk of false air being drawn into the box reduced still further.

The mechanism for shaking the trough or the trough and box may conveniently be electrically driven and the control for the period and intensity of swinging may be readily obtained by means of an electrically operated time switch.

The invention will now be further described by way of example with reference to the accompanying drawings in which:

Fig. 1 is a diagrammatic side elevation partly in section of one form of machine suitable for carrying out the invention, Fig. 2 is a plan view of the embodiment of Fig. 1 with certain parts removed for the sake of clarity, Fig. 3 is a detail diagrammatic view of a modification, Fig. 4 is a diagrammatic view of another modification, Fig. 5 is a plan view of a modified box partly in section with certain parts removed, Fig. 6 is a diagrammatic representation of an alternative form of control, Fig. 7 is a plan view of part of a modified trough, and Fig. 8 is a fragmentary section on the line VIII—VIII of Fig. 7 to an enlarged scale.

Referring now to Fig. 1, a heat transfer process machine includes an elongated trough 10, the bottom of which is perforated as at 11 over the major part of its length to form a grate. The trough 10 may, for example, be up to 60' in length, 3' in width and 2' in depth. The trough 10 is swingably mounted above a box 12 by means of links 13 which are pivoted as at 14 to the trough and as at 15 to the box with springs 48 interconnecting the trough and the box. The box 12 is connected by a duct 16 to a fan 17. One end of the trough 10 is connected to a driving mechanism 18 adapted to impart a shaking motion to the trough 10.

A loading station adjacent one end of the trough 10 includes three hoppers and jigging feeders 19, 20 and 21 which are operated respectively by electrically driven driving mechanisms 22, 23, 24. Adjacent the loading station there is provided an igniter 25 equipped with a burner assembly 26 supplied by means not shown with liquid fuel through a pipe 27. At the discharge end of the conveyor a discharge chute 28 is provided.

In the operation of a heat transfer process machine according to the present invention for sintering, it has been found advantageous to provide a protective layer of treated material immediately on the bottom of the trough in order to reduce to some extent the heat to which the bottom of the trough is subjected. Accordingly the feeder 19 may be supplied with cold clinker which is deposited as a layer 30 on the bottom of the trough. The second feeder 20 is arranged to receive the raw material from an extruder 31 and a revolving drum 32. The extruder 31 supplies the material in the form of small lumps into the revolving drum 32 wherein the lumps are made firmer and are given a more regular shape. The material is fed as a layer 33 on top of the layer of clinker 30. The third feeder 21 is arranged to deposit a layer of fuel 34 on top of the layer of material 33.

The driving mechanism 18 for imparting a shaking movement to the trough 10 is electrically driven and connected to an electricity supply by leads 35 through a controller which as shown is preferably in the form of a time switch 36. The motors 22, 23, 24 for operating the feeders 19, 20, 21 may also be connected to an electricity supply through the time switch 36. The time switch is preferably electrically driven and includes change-over contacts comprising a moving contact 37 and fixed contacts 38, 39. The time switch is arranged so that the moving contact 37 normally rests on fixed contact 38 but is periodically operated for a short duration of time to engage fixed contact 39. When the moving contact is in engagement with fixed contact 38 a circuit is completed from leads 35 to motors 22, 23 and 24 for operating the feeders 19, 20 and 21. When the moving contact engages fixed contact 39 the feeders are no longer operated but a circuit is completed from leads 35 to the driving mechanism 18 and the trough has a shaking movement imparted to it.

The time switch 36 may be adjusted in such a manner that the moving contact is in engagement with the fixed contact 38 for a relatively long period for example two minutes, and is only in engagement with fixed contact 39 for a short period for example a few seconds. In operation it has been found convenient for the length of a shaking period and the intensity of the shaking during such period to be so chosen that material on the trough advances about two feet during each shaking period. During a shaking operation the driving mechanism 18 mainly serves to push the trough repeatedly in one direction against the springs 48 which serve also to return the trough rapidly in the opposite direction so that the layers of material in the trough progress with a generally sliding action. The feeders are preferably so adjusted that during each rest period, that is to say, the interval between successive shaking periods, the feeder 19 deposits a layer of clinker approximately 2' in length and 3" in thickness on the bottom of the trough 10, the hopper and feeder 20 deposits a layer of raw material about 2' in length and about 14" in depth on to the layer of clinker which was previously deposited, and that the feeder 21 deposits a thin layer of fuel, which may be crushed fuel, approximately 2' in length on the layers of previously deposited material. Thus during one interval a layer of clinker is deposited on the bottom of the trough 10 and during a subsequent interval when the layer will have been advanced down the trough into the range of the feeder 20 a layer of raw material is deposited on the layer of clinker.

Subsequent shaking of the trough brings these two layers into the range of the feeder 21 and the layer of fuel is deposited on top of the layer of material. Subsequent movements imparted to the trough 10 bring the three layers into the range of the ignition device 25 whereupon the fuel layer is ignited by flames from the oil burners 26. The advancement of the three layers into the range of the ignition device 26 has brought them over perforated portions 11 in the bottom of the trough and air is caused by the fan 17 to be drawn downwardly through the three layers into the box 12 and thence through the duct 16. When the fuel is ignited the hot combustion gases are drawn through the layers of material into the box 12 and during their passage through the material the latter is heated up to the temperature required for the heat transfer process. In certain cases the raw material may be mixed with solid fuel and the heat developed during the combustion of such mixed fuel which will now take place will promote the burning process. Subsequently to passing beneath the ignition device 25 the material continues to be advanced along the trough 10 during successive shaking periods and so long as it remains on the trough air is drawn through the material into the box 12. When the material reaches the discharge end of the trough it is delivered into the chute 28.

In order to maintain an effective seal between the trough 10 and the box 12 during the intervals between the shaking periods it is advisable for the time switch 36 to be so adjusted in relation to the movement of the trough 10, that the movement ceases as far as possible when the trough is in contact with the box and the gap between them is as small as possible. The trough may be coupled to the box by any suitable device such as a magnetic coupling which is adapted to be released during the shaking periods.

In the embodiment illustrated in Figs. 1 and 2 the trough 10 is a separate unit from the box 12 but an improved seal between the trough and box can be obtained as shown in Fig. 3 by firmly securing the trough 10 to the box 12 such as by means of bolts 40 to form a unitary construction, and by mounting the box on links 41 pivotally mounted to the box as at 42 and to anchorages as at 43 and including springs 44 between the anchorage and the box. In order to allow of the movement of the box a flexible connection 45 is inserted in the duct 16 leading to the fan. Thus the driving mechanism 18 can impart shaking movement both to the box and trough. In such an arrangement there is little danger of false air being drawn into the box.

In the apparatus illustrated in Figs. 1 and 2 the trough 10 is disposed above a single box 12 and thus the air which is caused to traverse through the material in the trough can only flow in one direction through the material throughout the perforated length of the trough. Under certain conditions it may be desirable for the air to pass through the material in one direction in one zone of the trough and in the opposite direction in another zone of the trough, or alternatively, it may be advisable to have different rates of flow of air through the material in different zones of the trough or yet again, from a heat efficiency aspect, it may be advisable to separate out the high temperature gases which pass through the material in the trough in the zone of the ignition device 25 from the cooler gases or air which pass through the material in the zone of the discharge end of the trough. Such requirements can be readily obtained by the modifications illustrated in Figs. 4 and 5. In the arrangement of Fig. 4 two troughs 10a and 10b are provided adjacent one another so that material discharged from trough 10a falls into a loading end of trough 10b. Separate boxes 12a, 12b are provided beneath the troughs and separate ducts 16a, 16b lead to separate fans. Separate mechanisms 18a, 18b are provided for imparting shaking movement to each of the troughs. Thus the air or gases passing through the material in trough 10b may be separated from those passing through the material in trough 10a and may be in the same or in another direction. In the arrangement illustrated diagrammatically in Fig. 5 the box beneath a single trough is sub-divided for example by a partition 46 to form two compartments 12c, 12d each of which is connected for example by ducts 16c, 16d to separate fans 17a, 17b. Thus the air or gases passing through the material when in the zone of the trough lying above compartment 12c can be separated from that or those passing through the material when in the zone of the trough lying above the compartment 12d and can be in the same or opposite directions.

In the form of control of the driving mechanism 18 illustrated in Fig. 1 it will be appreciated that the time switch 36 serves to start and stop the driving mechanism 18 but in an alternative arrangement the driving mechanism 18 may be kept in operation continuously but its speed may be controlled. For example, as illustrated in Fig. 6 time switch 36 may be arranged to control a speed controller 47 for driving mechanism 18. Normally the moving contact 37 of the time switch engages fixed contact 38 to energise the motors 22, 23 and 24 of the feeders. For short periods of time moving contact 37 disengages fixed contact 38 and engages fixed contact 39 to disconnect the motors 22, 23 and 24 but to connect with the speed controller 47 to cause it to increase the speed of the driving mechanism 18 to shake the trough at a speed sufficient to cause advancement of the material along the trough. During the interval between such periods the speed controller reduces the speed of the driving mechanism 18 to a value below that at which movement of the trough would advance the material therein.

The perforations 11 in the trough 10 illustrated in Figs. 1 and 2 extend longitudinally of the trough, but in a modified form these perforations can extend transversely of the trough as illustrated at 11a in Fig. 7. Whilst the transverse perforations 11a can extend normally through the bottom of the trough they can, as shown in Fig. 8, be inclined upwardly therethrough in the direction of movement of material as indicated by the arrow 49, thereby reducing any tendency for small particles of material to pass through the perforations.

For certain applications of the present invention, for example, in the case of a simultaneous manufacture of sulphuric acid and Portland cement from materials containing gypsum, it will be advisable to make the perforated bottom of the trough and the walls of the box of special materials such as cast iron or stainless steel though in normal cases these parts may be made of manganese steel. In still further instances it may be necessary to provide a fire-brick lining to either the trough or the box.

Thus the present invention allows shaking action of the trough to be applied most effectively and materially reduces the intake of false air with a resulting increased heat economy. Moreover, the shaking action of the trough closes any gaps which may be formed in the material undergoing treatment as a result of shrinkage of such material so that substantially even distribution of the material is maintained with a consequent uniformity of treatment of material.

I claim:

1. A method of operating a heat treating machine of the type including an elongated perforated trough including the steps of feeding materials to be heat treated and fuel to the trough adjacent one end thereof, shaking the trough intermittently for short periods of time at a speed to cause materials thereon to progress from said one end to the other end thereof and maintaining said trough stationary in longer intervals between said short periods of time, igniting the fuel thereon, causing air to pass through the material and fuel thereon, and discharging heat treated material intermittently from said other end.

2. A method of operating a sintering machine of the type including an elongated perforated trough including the steps of feeding materials to be treated and fuel to the trough adjacent one end thereof, shaking the trough during short periods of time at a speed to cause materials thereon to progress from said one end towards the other end thereof and shaking said trough in the intervals between said short periods of time at a speed insufficient to cause any substantial progress of materials on said trough, igniting the fuel thereon, causing air to pass through the material and fuel thereon, and discharging treated material intermittently from said other end.

3. A method of subjecting materials such as ores, lime, clay, shale and the like to a heat transfer process such as roasting, sintering, calcining, drying and the like, including the steps of feeding materials to be treated and fuel to an elongated perforated trough at a loading station adjacent one end thereof, shaking the trough intermittently at a speed to cause materials thereon to progress substantially step-wise from said loading station in succession through an ignition zone, a treatment zone, to a discharge station at the other end thereof, igniting the fuel thereon in said ignition zone, causing air to pass through the material and fuel thereon at least in said treatment zone, and discharging treated material intermittently from said discharge station.

4. A method of subjecting materials such as ores, lime, clay, shale and the like to a heat transfer process such as roasting, sintering, calcining, drying and the like, including the steps of feeding material to be treated and fuel to an elongated part perforated trough at a loading station adjacent one end thereof, shaking the trough intermittently during short periods of time at a speed to cause materials to progress substantially step-wise from said loading station in succession through an ignition zone and a treatment zone to a discharge station at the other end thereof, and shaking said trough in the longer intervals between said short periods of time at a speed insufficient to cause any substantial progress of materials on said trough, igniting said fuel in said ignition zone, causing air to pass through the material and fuel thereon at least in said treatment zone, and discharging treated material intermittently from said discharge station.

5. A method of subjecting materials such as ores, lime, clay, shale and the like to a heat transfer process such as sintering, roasting, calcining, drying and the like including the steps of feeding materials to be treated and fuel to an elongated part-perforated trough at a loading station adjacent one end thereof, shaking the trough intermittently during short periods of time at a speed to cause materials to progress substantially stepwise from said loading station in succession through an ignition zone, a treatment zone to a discharge station at the other end thereof, and shaking said trough in the longer intervals between said short periods of time at a speed insufficient to cause any substantial progress of materials on said trough, igniting said fuel in said ignition zone, withdrawing gases in a downward direction through the material and fuel on said trough in said ignition zone and in part of said treatment zone, causing air to pass in an upward direction through the material on the trough in a second part of said treatment zone and discharging treated material intermittently from said discharge station.

References Cited in the file of this patent

UNITED STATES PATENTS

| | | |
|---|---|---|
| 973,481 | Cunneen | Oct. 25, 1910 |
| 1,535,695 | Spence | Apr. 28, 1925 |
| 1,906,755 | Karrick | May 2, 1933 |
| 1,918,535 | Greenawalt | July 18, 1933 |
| 1,926,032 | Bunce | Sept. 12, 1933 |
| 2,094,785 | Flint | Oct. 5, 1937 |
| 2,380,452 | Kohout | July 31, 1945 |
| 2,420,126 | Curll et al. | May 6, 1947 |
| 2,473,193 | Campion | June 14, 1949 |
| 2,492,585 | Kohout | Dec. 27, 1949 |
| 2,521,591 | Martin | Sept. 5, 1950 |
| 2,531,975 | Essex et al. | Nov. 28, 1950 |

FOREIGN PATENTS

| | | |
|---|---|---|
| 96,210 | Austria | Mar. 10, 1924 |
| 631,813 | Germany | June 27, 1936 |
| 334,910 | Great Britain | Sept. 10, 1930 |

OTHER REFERENCES

Metals Handbook, 1948 ed., p. 7.